United States Patent [19]

Deshaw

[11] 4,444,466
[45] Apr. 24, 1984

[54] UNIVERSAL JOINT SEAL AND VIBRATION DAMPER FOR REMOTELY ACTUATED PIVOTAL DEVICES

[75] Inventor: Walter R. Deshaw, Sparta, Mich.

[73] Assignee: Keeler Corporation, Grand Rapids, Mich.

[21] Appl. No.: 343,426

[22] Filed: Jan. 28, 1982

[51] Int. Cl.³ .......................... G02B 7/18; F16C 11/08
[52] U.S. Cl. ..................................... 350/289; 248/487; 403/90; 403/133
[58] Field of Search ................ 350/289, 307; 248/481, 248/487, 482, 483, 484; 403/90, 132, 133, 143

[56] References Cited

U.S. PATENT DOCUMENTS

| Re. 27,172 | 9/1971 | Van Noord | 74/501 M |
|---|---|---|---|
| 2,288,767 | 7/1942 | Young | 403/143 |
| 2,292,676 | 8/1942 | Thiry | 403/133 |
| 2,573,127 | 10/1951 | Von Bredow | 88/93 |
| 2,664,029 | 12/1953 | Higgins | 88/93 |
| 2,862,419 | 12/1958 | Pryor | 88/98 |
| 3,212,740 | 10/1965 | Greenberg | 403/90 |
| 3,283,607 | 11/1966 | Van Noord | 74/501 |
| 3,319,982 | 5/1967 | Schwartz | 403/90 |
| 3,459,470 | 8/1969 | Hahn | 350/289 |
| 3,468,186 | 9/1969 | McIntyre et al. | 74/501 |
| 3,474,686 | 10/1969 | Liedel | 74/501 |
| 3,552,229 | 1/1971 | Cummins et al. | 74/501 |
| 3,576,359 | 4/1971 | Cosh | 350/289 |
| 3,609,014 | 9/1971 | Kurz, Jr. | 350/289 |
| 3,628,862 | 12/1971 | Stephenson | 350/289 |
| 3,653,276 | 4/1972 | McIntyre et al. | 74/501 |
| 3,917,212 | 11/1975 | Hadley et al. | 248/487 |
| 3,918,319 | 11/1975 | Mills | 74/491 |
| 3,972,597 | 8/1976 | Repay et al. | 350/289 |
| 4,089,233 | 5/1978 | Sebald | 74/424.8 A |
| 4,101,205 | 7/1978 | Bos | 350/289 |
| 4,101,206 | 7/1978 | Oskam et al. | 350/289 |
| 4,108,541 | 8/1978 | Eiraku | 350/289 |
| 4,158,483 | 6/1979 | Fisher et al. | 350/289 |
| 4,167,306 | 9/1979 | Longland | 350/289 |
| 4,245,893 | 1/1981 | Lafont et al. | 350/289 |
| 4,341,444 | 7/1982 | Stelma | 350/289 |

*Primary Examiner*—Jon W. Henry
*Attorney, Agent, or Firm*—Price, Heneveld, Huizenga & Cooper

[57] ABSTRACT

A remotely actuated pivotal device is provided comprising a weathertight housing, a spherical projection disposed on the back of the device and a socket disposed on the housing. A circular elastomeric O-ring is disposed in the socket and a wobble stick for pivotally actuating the device extends through the O-ring and the socket. The spherical projection is disposed within the socket such that the device is capable of independent pivotal movements about the socket. A universal joint that limits the motion of the device to pivotal movements about orthogonal X and Y axes is provided for compressing the sphere against the O-ring to provide both a weathertight seal for said housing and to dampen vibration of the pivotally actuated device.

32 Claims, 15 Drawing Figures

Fig. 15.

UNIVERSAL JOINT SEAL AND VIBRATION DAMPER FOR REMOTELY ACTUATED PIVOTAL DEVICES

BACKGROUND OF THE INVENTION

The invention relates generally to a combination seal and vibration damper for remotely pivotable devices and, more particularly, is directed to an electrically actuated outside rearview mirror for motor vehicles which is universally adjustable, with separate motions about two oblique, coplanar axes and which is provided with a weather-tight housing having an improved seal and mirror dampening means.

Electrically actuated outside rearview mirrors for motor vehicles are known in the prior art. These mirrors are remotely operable from the interior of the vehicle by appropriate actuating switches or the like. In many cases, these mechanisms only provide for the pivotal movement of the mirror or mirrors about the vertical axis. Such electrically actuated rearview mirrors adjustable about a vertical axis are frequently found on trucks, buses, tractor trailers and the like.

Electrically actuated outside rearview mirrors and similarly related devices which are adapted to be pivoted about a pair of non-colinear or orthogonal axes, such as a horizontal and vertical axis, are of course, more complex and costly. This added cost and complexity is a factor that has led to the popularity of mechanical cable actuated remote control rearview mirrors in the automotive field rather than electrically actuated mirrors. The electrical actuation of outside rearview mirrors is more difficult because of the requirement of pivoting the mirrors about mutually orthogonal axes. This dictates the use of two separate electrical drive mechanisms which are operable independently of each other. Even though relatively small electrical motors are available, there are obvious difficulties in packaging the motor and associated drive train within the mirror housing in a manner that withstands extreme temmperatures, vibration, shock loading, moisture, salt and other road chemicals. Road vibration is a particularly acute problem with several prior art designs since these designs allow the mirror to flutter at certain vibration frequencies encountered during normal road travel, thus blurring the mirror image and substantially reducing the effectiveness of the mirror. Moreover, these prior art designs do not provide for accuracy of operation in that the operating clearances apparently required by the design of the drive means and the mode of coupling the same with the mirror are such that the mirror is subject to uncontrolled multi-directional pivotal movements or "drift", as opposed to accurately controlled single-directional pivotal movement, when either of its drive means is independently operated, as for instance, when an operator desires to achieve only vertical or horizontal adjusting movements of the mirror.

A further problem associated with many prior art electrically actuated rearview mirrors is a lack of adjustability in the event of a power failure. This lack of adjustability can cause a dangerous set of circumstances wherein the mirror has little or no utility to the operator because of its lack of adjustability to accommodate operators with varying heights and seating positions.

The present invention is directed to an improvement to the mirror disclosed in copending U.S. application Ser. No. 174,535 filed Aug. 1, 1980 entitled Electrically Operated Remote Control Rearview Mirror and assigned to the same assignee. While the mirror discosed in the foregoing application solves many of these problems in the prior art, this mirror also proved to be somewhat susceptible to vibration induced image distortion and the deleterious effect of moisture and chemicals. Furthermore, the elastomeric boot which is used to seal the housing penetration of this mirror is relatively costly and difficult to install.

SUMMARY OF THE INVENTION

The present invention solves these and other problems in the prior art by provision of an improved universal joint seal and vibration damper for pivotally actuated devices. When applied to a pivotally actuable remotely controlled mirror, the mirror comprises a weather-tight housing and means for mounting the mirror on the exterior of the housing for pivotal motion about at least a pair of mutually orthogonal X and Y axes. This provides a mirror that is universally adjustable about the housing. A spherical projection is disposed on the back of the mirror, the spherical projection being approximately centered on a Z axis which is orthogonal to the X and Y axes. A wobble stick extends from the back of the mirror. The wobble stick is also approximately centered on the Z axis. A sphere is slidably mounted for reciprocal movement on the wobble stick and conjunctive pivotal movement with the mirror about the X and Y axes. A single penetration is disposed in the weathertight housing and a socket is disposed on the housing, the socket surrounding the penetration. A circular elastomeric O-ring is disposed in the socket and the wobble stick extends through the penetration into the housing. The sphere is mounted on the wobble stick within the housing and X and Y drive means are disposed within the housing for engaging the sphere and pivoting the mirror about the X and Y axes, respectively. The X and Y drive means are each provided with surfaces which partially encompass and slidably engage the sphere for displacing the sphere and the wobble stick and thus pivot the mirror about the X and Y axes. The spherical projection disposed on the back of the mirror extends into the socket disposed on the housing and the means for mounting the mirror preloads the spherical projection against the O-ring disposed within the socket to provide a weathertight seal surrounding the housing penetration, which eliminates troublesome elastomeric boots or the like, and provides a means for dampening road induced vibration of the mirror.

DESCRIPTION OF THE PREFERRED EMBODIMENTS

Figures 1, 9, 10, 11, 12:
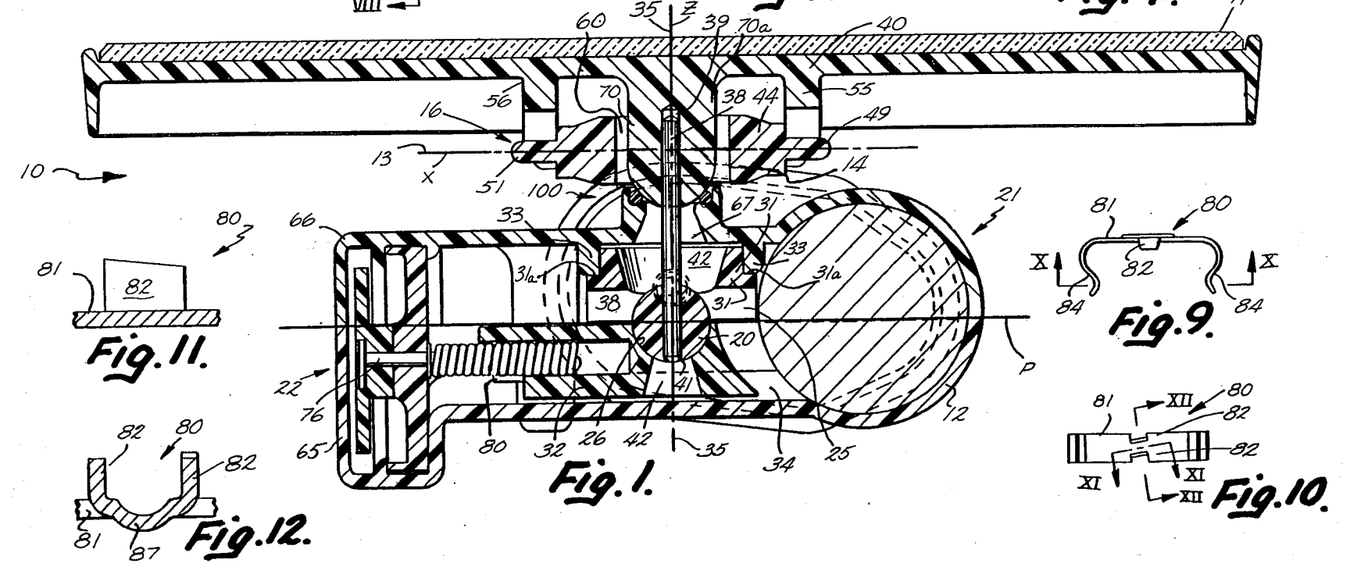
FIG. 1 is a plan view, in section, of the rearview mirror of the present invention.
FIG. 9 is an elevational view of a follower used in the rearview mirror of the present invention.
FIG. 10 is a view of the follower of FIG. 9 taken along line X—X of FIG. 9.
FIG. 11 is a partial sectional view to an enlarged scale of the follower of FIG. 10 taken along line XI—XI in FIG. 10.
FIG. 12 is a partial sectional view to an enlarged scale of the follower of FIG. 10 taken along XII—XII of FIG. 10.
Figure 2:
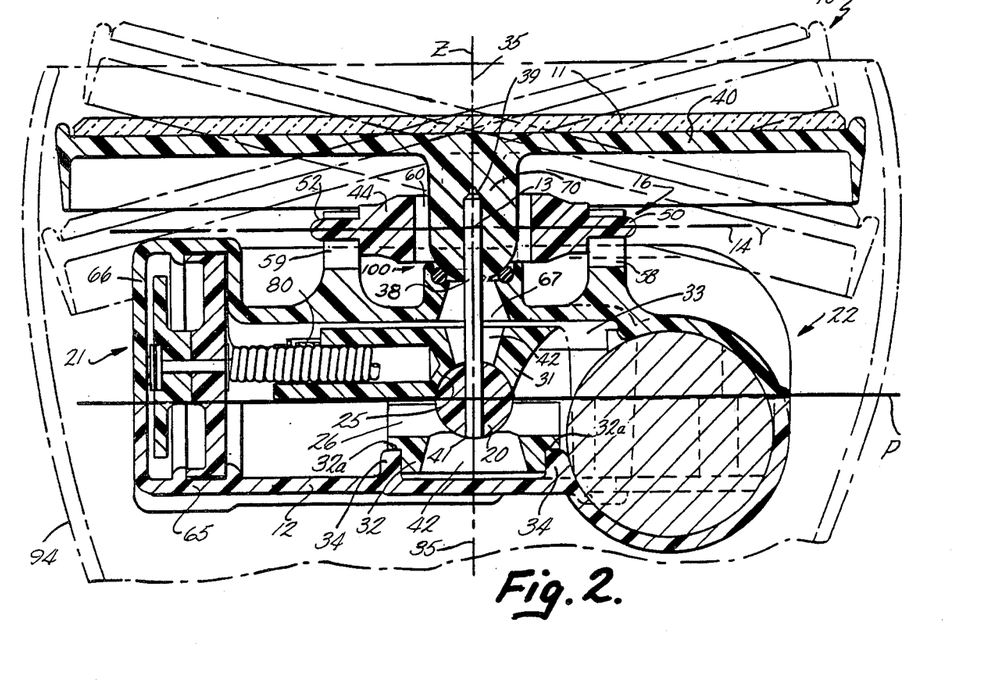
FIG. 2 is a side elevational view, in section, of the rearview mirror of the present invention.
Figures 3, 13:
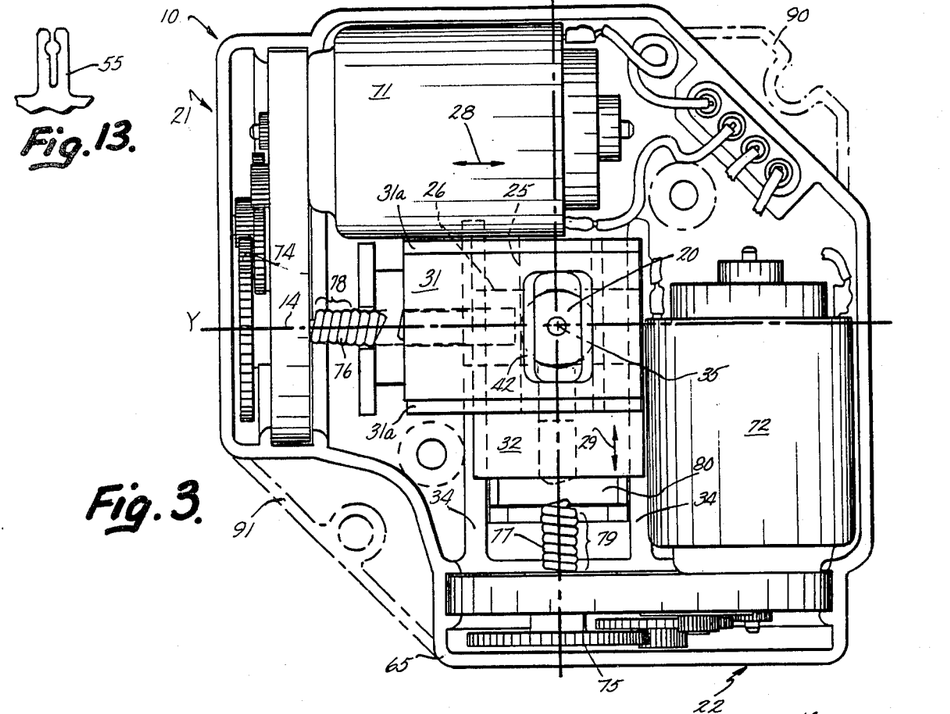
FIG. 3 is a rear elevational view, with respect to the vehicle it is to be mounted on, of the housing of the rearview mirror of the present invention, with the rear cover plate removed.
FIG. 13 is a detailed view of a bifurcated bearing post employed in the rearview mirror of the present invention.

Referring now to FIGS. 1, 2 and 3, an electrically actuated rearview mirror assembly which embodies the improved seal and vibration damper of the present invention is illustrated at 10. The present invention is thought to have applications on various types of pivotally actuatable devices but is known to have particular utility when combined with the remote controller mirror illustrated at 10. The assembly comprises a mirror 11, a mirror support in the form of a weathertight housing 12, and means for pivotally mounting the mirror 11 on the support 12 about mutually orthogonal X and Y axes 13 and 14, respectively. Preferably, the means for pivotally mounting the mirror 11 comprises a universal joint 16 of the general type disclosed in commonly assigned U.S. Pat. No. 4,286,841 issued Sept. 1, 1981. The assembly 10 further includes an actuator member, preferably in the form of a sphere 20 mounted on the back of the mirror 11, and remotely actuated drive means including X and Y drive means 21 and 22, respectively, which are mounted on support 12 and operably engaged with sphere 20 for the purpose of effecting accurately controlled pivotal movements of mirror 11 about axes 13 and 14 in the manner to be described.

Figure 15:
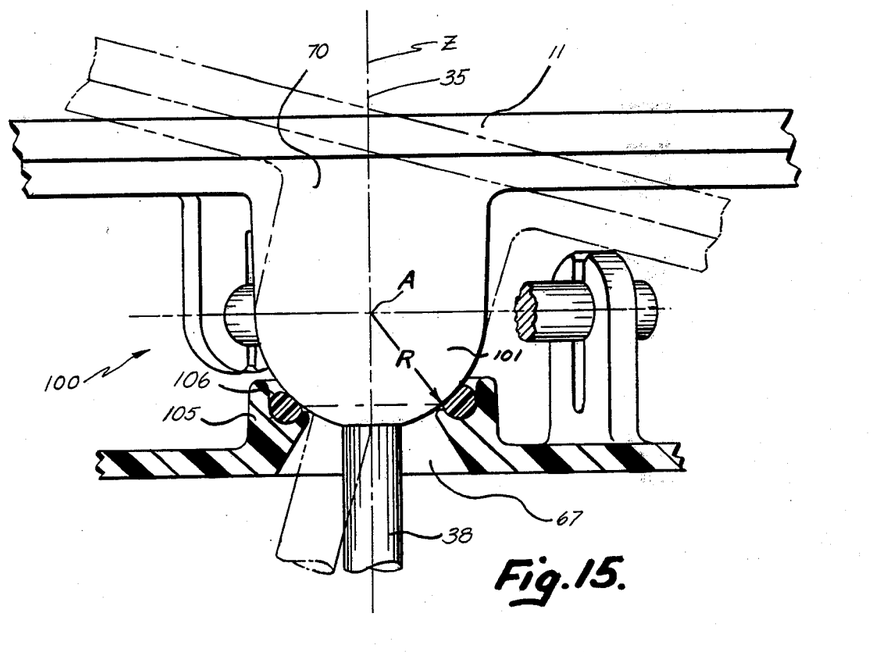
FIG. 15 is a detailed view, partially in section, of the improved weather seal and vibration dampening device of the present invention.

With reference now also to FIG. 15, the improved weather seal and dammpening means of the present invention is illustrated in further detail. The improved seal and dampening arrangement is indicated generally by the numeral 100. The mirror is provided with a cylindrical boss 70 having a spherical projection 101 disposed on the end thereof. The spherical projection 101 is approximately centered on a Z axis 35 which is orthogonal to both the X and Y axes. The sphere 20 is mounted on the back of the mirror 11 with a wobble stick 38 that is centered on the Z axis. The sphere 20 is slidably mounted on the wobble stick for reciprocal movement thereon and conjunctive pivotal movement with the mirror. As will hereinafter be described, the sphere 20 is constrained by the X and Y drive means to move in a plane for selectively or simultaneously pivoting the mirror about the X and Y axes. A penetration or aperture 67 is disposed in the weathertight housing 12 and a socket 105 is disposed on the housing surrounding the penetration 67. A circular elastomeric O-ring 106 is disposed within the socket. The spherical projection 101 extends into the socket and the wobble stick 38 extends through the penetration 67 disposed in the weathertight housing 12. The sphere 20 is disposed within the housing 12 for engagement by the X and Y drive means 21 and 22. Means are provided for preloading the spherical projection 101 against the elastomeric O-ring 106 to provide both a weathertight seal surrounding the penetration 67 as well as providing a means for dampening the vibration of the mirror 11. In this case, the means for preloading the spherical projection 101 against the O-ring 106 comprises the dimensional relationship of the four bearings associated with the universal joint 16. More particularly, with reference to FIG. 7, the universal joint 16 is provided with bearing posts 49 through 52 which are provided with a dimensional relationship with bifurcated projections 55, separately illustrated in FIG. 13, associated with the back of the mirror 11 and the exterior of the housing 12. The X and Y axes intersect at a point A and the spherical projection 101 is provided with a cross section that approximately follows a radius R that sweeps an arc having its center disposed at A. This structurally simple, but elegant seal eliminates the troublesome and relatively costly elastomeric boot which was clamped to the back of the mirror and the housing for sealing mirror housing penetrations in the prior art. Furthermore, preloading of the spherical projection 101 against the elastomeric O-ring absorbs lost motion resulting from manufacturing tolerances and effectively dampens road induced vibration of the mirror which can cause distortion of the mirror image.

The X and Y drive means 21 and 22 include first and second concave cylindrical surfaces 25 and 26, respectively, which are disposed to extend in mutually orthogonal directions, as illustrated in FIG. 3 and are arranged in engagement with opposite portions or sides of the surface of sphere 20, as illustrated in FIGS. 1 and 2. Preferably, surfaces 25 and 26 have radii of curvature essentially corresponding to the radius of curvature of sphere 20 and extend through an arc $\alpha$, shown in FIG. 5, which approaches 180 degrees. However, the first and second surfaces 25 and 26 may have any concave shape that at least partially encompasses the sphere 20. For example, the surfaces 25 and 26 may be V-shaped in cross section or together may present a hexagonal shape. A concave angular shape may be preferred to facilitate manufacturing. However, in the present embodiment a cylindrical shape is preferred since it provides line rather than point contact with the sphere 20. The first and second cylindrical surfaces 25 and 26 are mounted for reciprocating movement within the support 12 and cooperate to constrain sphere 20 for movements in mutually orthogonal directions within a plane designated as P in FIGS. 1 and 2. With particular reference now to FIG. 3, it will be understood that when the first cylindrical surface 25 is displaced in the direction of the arrows 28 and surface 26 is maintained stationary, the sphere is forced by surface 25 to move in a direction aligned with arrows 28, while undergoing relative sliding movement axially along surface 26, to effect pivotal movement of mirror 11 solely about the X axis 13. Likewise, when the second cylindrical surface 26 is displaced in the direction of the arrows 29, and surface 25 is maintained stationary, sphere 20 is forced by surface 26 to move in a direction aligned with arrows 29, while undergoing relative sliding movement axially along surface 25 to effect pivotal movement of mirror 11 solely about the Y axis 14. If X and Y drive means 21 and 22 are simultaneously operated, surfaces 25 and 26 will be displaced at the same time and sphere 20 will experience driven displacements by and undergo sliding movements relative to both of such surfaces. Thus, surfaces 25 and 26 cooperate, when displaced in the manner described above, to provide for accurately controlled single-directional or multi-directional pivotal movements of mirror 11, as desired, and further by encapsulating sphere 20 in a closely confined manner serve to hold the mirror 11 firmly at predetermined angular orientations in a manner that inhibits mirror flutter induced by road vibration.

Figure 4:
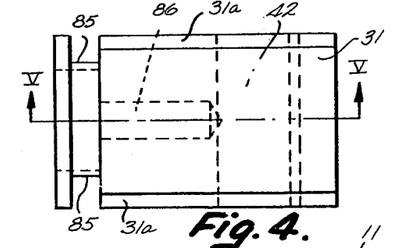
FIG. 4 is an elevational view of a slider incorporated in the rearview mirror of the present invention.
Figure 5:
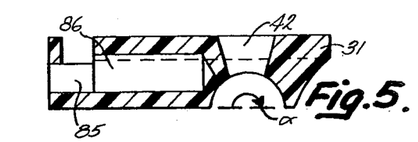
FIG. 5 is a sectional view of the slider illustrated in FIG. 4, taken along line V—V in FIG. 4.
Figures 6, 7, 8, 14:
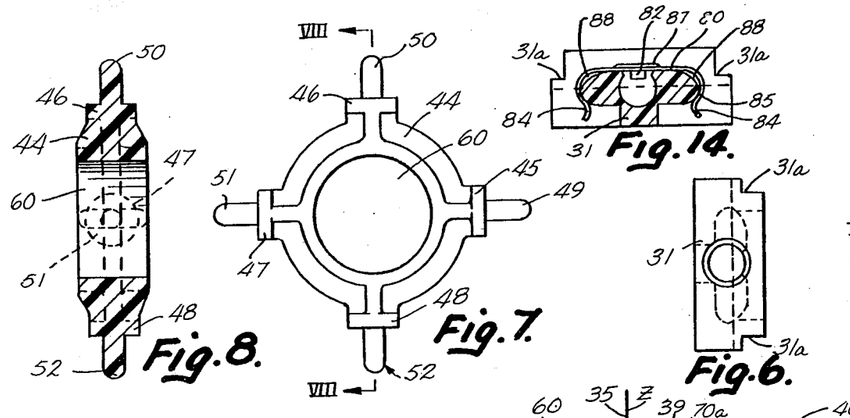
FIG. 6 is an end slide view of the slider illustrated in FIG. 4.
FIG. 7 is an elevational view of a universal joint cross used in the rearview mirror of the present invention.
FIG. 8 is a sectional view of the cross illustrated in FIG. 7 taken along line VIII—VIII in FIG. 7.
FIG. 14 is an end view partially in section of a slide with a follower mounted thereon.

The first and second cylindrical surfaces 25 and 26 are preferably defined by first and second slide members or slides 31 and 32, respectively, which are of identical constructions with a representative slide 31 being shown in detail in FIGS. 4, 5 and 6. The slide members are shown in FIGS. 1 and 2 as being supported for reciprocating movements in mutually orthogonal directions by pairs of parallel guide rails 33 and 34, which are fixed to support 12 and slidably engaged within pairs of parallel guide recesses 31a and 32a arranged to extend lengthwise of slide members 31 and 32, respectively. Preferably, the sphere 20 and the first and second slides 31 and 32 are formed from a lubricious plastic to reduce frictional losses in the drive means. It would also be preferable to provide suitable spring means operable to continuously bias surfaces 25 and 26 into compressive engagement with sphere 20 and slide members 31 and 32 into engagement with sphere 20 and slide members 31 and 32 into engagement with guide rails 33 and 34 in order to prevent the occurrence of any lost motion in the drive means, as might otherwise result from required manufacturing tolerances of these elements or temperature induced expansions/contractions of the overall mirror assembly. This spring means would preferably be provided by forming slide members 31 and 32 of a plastic material capable of undergoing a required degree of resilient deformation, and sizing the slide elements such that they become slightly bowed or deformed as a result of being installed in engagement with sphere 20 and their associated guide rails. Alternatively, guide rails 33 and 34 could be formed of a resiliently deformable material or separate spring elements could be employed to provide a desired degree of bias.

The sphere 20 preferably is slidably mounted on the back of mirror 11 for reciprocal movement along the Z axis 35. Means for slidably mounting the sphere 20 on the back of the mirror 11 is provided comprising wobble stick or control rod 38 extending rearwardly from the mirror 11 along the Z axis 35. In this case, the wobble stick 38 is rigidly secured to the mirror 11 by pressing the wobble stick 38 into a cylindrical aperture 39 provided in a backing plate 40 of mirror 11, and the sphere 20 is provided with a centrally located cylindrical aperture 41 for slidably receiving the wobble stick 38. However, it should be understood that in the alternative the sphere 20 may be fixed on the wobble stick 38, or integrally formed therewith, and the wobble stick 38 may be slidably received in the aperture 39 provided on the back of the mirror. The slides 31 and 32 include apertures 42 through which the wobble stick freely extends. The sphere 20 must be displaceable relative to the back of mirror 11 along the Z axis 35, since the mirror 11 is displaced with pivotal movements and the sphere 20 is displaced linearly.

Preferably, the means for pivotally mounting the mirror 11 about the X and Y axes 13 and 14 comprises a universal joint, generally indicated by the numeral 16.

The universal joint comprises a cross 44, separately illustrated in further detail in FIGS. 7 and 8. The cross 44 is provided with arms 45 through 48, including bearing shafts 49 through 52 disposed on the ends thereof. The bearing shafts 49 and 51 are disposed on the X axis 13 and are preferably snap-locked in place in bifurcated bearings posts 55 and 56, which define cylindrical bearing surfaces, disposed on the backing plate 40 of the mirror 11. As best illustrated in FIG. 2, the bearing shafts 50 and 52 extend along the X axis 14 and are preferably snap-locked in place in bifurcated bearing posts 58 and 59 disposed on the support 12. FIG. 13 presents a detailed view of a representative bifurcated bearing post 55. In this manner, the mirror 11 is easily mounted to the housing 12 by snapping the shafts 49 through 52 of the cross 44 into the bifurcated posts 55 through 59 of the mirror backing plate 20 and the housing 12.

The universal joint cross 44 further includes a central aperture 60 through which the wobble stick 38 extends. This feature facilitates a superior arrangement for sealing the wobble stick 38, the sphere 20 and the X and Y drive means 21 and 22 from environmental debris. More specifically, the support 12 comprises first and second housing halves 65 and 66 which fully encapsulate the X and Y drive means 21 and 22 and the sphere 20 with the exception of an aperture or housing penetration 67 disposed in the second housing half 66. The wobble stick 38 extends through the aperture 67 and the seal 100 defines a watertight barrier around the aperture 67. As long as the bearings disposed on the universal joint 16 are provided with a dimensional relationship that places sufficient compressive force on the O-ring 106 a fluid seal is provided surrounding the aperture 67 by simply inserting the wobble stick 38 into the aperture 67 and snap-locking the bearing posts 49 through 52 into the bifurcated projections 55 disposed on the back of the mirror 11 and the exterior of the housing 12. This arrangement thus effectively seals the wobble stick 38, the sphere 20, and the X and Y drive means 21 and 22 from the environment.

With particular reference now to FIG. 3, the X and Y drive means 21 and 22 are illustrated in further detail. The X and Y drive means 21 and 22 comprise reversible drive motors 71 and 72, respectively, that are connected to a suitable power supply and suitable control circuitry not illustrated herein. Furthermore, the motors 71 and 72 are provided with non-reversible gear reduction transmissions 74 and 75, respectively, interconnecting the drive motors 71 and 72 with output shafts 76 and 77, respectively. The output shafts 76 and 77 are each at least partially covered or encompassed by helical tracks, or worm gears 78 and 79, respectively, such as may be defined by closely wound helical springs. The first and second slides 31 and 32 are provided with first and second clutch mechanisms including followers 80. The followers 80 slidably engage the helical tracks 78 and 79 so that the first and second slides 31 and 32 reciprocate lengthwise of guide rails 33 and 34 when the output shafts 76 and 77 rotate. Rotation of the drive motor 71 or 72, respectively, will cause movement of one of the slides 31 or 32 in a direction dependent on the direction of rotation of the respective drive motor. Preferably the followers 80 are spring biased into engagement with the helical tracks 78 and 79. Spring biasing of the followers 80 into engagement with the helical tracks 78 and 79 allows the tracking force created by engagement of the followers and the tracks to be overcome by an operator manually exerting a turning force on the mirror 11 so that in the heretofore potentially dangerous situation where a power loss occurs, the operator can manually adjust the mirror in a ratchet-like fashion by physically rotating the mirror with a force sufficient to overcome the tracking force created by the spring biased followers 80. When the operator applies a manual adjustment force, the mirror will move in the intended direction upon the application of sufficient force in a step-like, ratchet-like manner that is created by the spring biased followers jumping to adjacent grooves on the helical tracks 78 and 79. Furthermore, this feature prevents damage or overstressing of the drive train components of the X and Y drive means when an adjustment stop of the mirror 11 is met. In this case, when the operator does not realize that the mirror has reached an adjustment stop and further power is applied to one or both of the X and Y drive means, rather than binding the drive motors to a stop, the drive motors and transmission are permitted to continue to rotate while the spring biased followers 80 jump to adjacent grooves on the helical tracks 78 and 79. This action results in a clicking noise that is appreciated by the operator as an indication that he has reached a limit stop.

With further reference now to FIGS. 4 through 6 which illustrate the slides of the X and Y drive means and FIGS. 9 through 12 which illustrate details of the spring biased followers. Each follower comprises a spring clip in the form of a leaf spring 81 having at least one projection 82 mounted thereon. The projection 82 engage the grooves defined by t racks 78 and 79 on the output shafts of the X and Y drive means. Each leaf spring 81 is provided with resilient arcuate arms 84 disposed on opposite ends thereof for engaging surfaces 85 disposed on the slides. After the free ends of helical tracks 78 and 79 are inserted within cylindrical apertures or bearing openings 86 formed in slides 31 and 32, the leaf spring 81 are snap-locked over the gripping surfaces 85 with the projections 82 extending into apertures 86 for engagement with the helical tracks. Apertures 86 are aligned with the direction of reciprocating movement of their associated slides and preferably sized to both rotatably and slidably receive helical tracks 78 and 79. FIG. 14 illustrates a follower 80 installed on a slide 31. It will be noted that the follower 80 is provided with a bead 87 for stiffening the follower in the area of projections 82. This prevents fatigue stress failure of the follower in the area of the projections 82. The generally cylindrical gripping surface 85 is relieved at 88 to allow the resilient arms 84 to flex when the projections 82 jump between adjacent grooves on one of the helical tracks.

With particular reference now to FIGS. 2 and 3, it is illustrated that the housing 12 is provided with mounting flanges illustrated in phantom at 90 and 91. The mounting flanges 90 and 91 are carried by the second housing half 66 and cooperate with mounting bosses (not illustrated herein) disposed within a mirror shell, illustrated in phantom at 94 in FIG. 2. Screws, bolts, or other suitable fasteners are used to mount the housing 12 within the mirror shell 94. Thereafter, the mirror 11 may be snap-locked in place for pivotal movement about the X and Y axes as illustrated in phantom in FIG. 2.

While the present invention is particularly intended for use with an electrically operated motor assembly, it will be understood that the X and Y drives may be otherwise powered, if desired.

The above description should be considered as exemplary and that of the preferred embodiment only. The true spirit and scope of the present invention should be determined by reference to the appended claims. It is desired to include within the appended claims all modifications of the invention that come within the proper scope of the invention.

The embodiments of the invention in which an exclusive property or privilege is claimed are defined as follows:

1. A universal joint seal and vibration damper for a pivotally actuated device comprising:
   a housing;
   means for mounting said device on said housing for pivotal movement about X and Y axes;
   a spherical projection disposed on the back of the pivotally actuated device;
   a socket disposed on said housing;
   a circular elastomeric O-ring disposed in said socket;
   means for actuating said pivotally actuated device extending through said socket;
   said spherical projection being disposed within said socket, said pivotally actuated device being capable of independent pivotal movements about said socket; and
   said means for mounting said device on said housing comprising a universal joint, said universal joint comprising a cross having four arms and a bearing means disposed on each of said arms, a first pair of said bearing means pivotally mounting said cross on said device and a second pair of said bearing means pivotally mounting said cross on said housing, said first and second pairs of bearing means being provided with a dimensional relationship with said device and said housing, respectively, that compresses said spherical projection against said O-ring to provide both a weathertight seal for said socket and a vibration damper for said pivotally actuated device.

2. An electrically actuated rearview mirror comprising:
   an X axis;
   a Y axis;
   a Z axis, said X axis, said Y axis and said Z axis being mutually orthogonal;
   a mirror;
   a weathertight housing;
   means for mounting said mirror on said housing for pivotal movement about at least said X and Y axes;
   a spherical projection disposed on the back of said mirror, said spherical projection being approximately centered on said Z axis;
   a wobble stick extending from the back of said mirror, said wobble stick being approximately centered on said Z axis;
   a sphere slidably mounted on said wobble stick for reciprocal movement thereon and conjunctive pivotal movement with said mirror;
   a penetration disposed in said housing;
   a socket disposed on said housing said socket surrounding said penetration;
   a circular elastomeric O-ring disposed in said socket;
   said spherical projection being extended into said socket with said wobble stick extending through said penetration in said housing with said reciprocating sphere disposed within said housing, said projection being preloaded against said O-ring to provide both a weathertight seal surrounding said penetration as well as providing a means for dampening vibration of said mirror;

said means for mounting said mirror comprising a universal joint, said universal joint comprising a cross having four arms and a bearing means disposed on each of said arms, a first pair of said bearing means pivotally mounting said cross on said mirror and a second pair of said bearing means pivotally mounting said cross on said housing, said first and second pairs of bearing means being provided with a dimensional relationship with said mirror and said housing, respectively, that preloads said spherical projection against said O-ring;

an X drive means disposed within said housing for pivoting said mirror about said X axis when electrical power is applied to said X drive means, said X drive means including a first surface partially encompassing and slidably engaging said sphere; and a Y drive means disposed within said housing for pivoting said mirror about said Y axis when electrical power is applied to said Y drive means, said Y drive means including a second surface partially encompassing and slidably engaging said sphere, said first and second surfaces extending in mutually orthogonal direction and being displaceable in mutally orthogonal directions when power is applied to said X and Y drive means, respectively, to effect displacements of said sphere and imparting pivotal movements in said mirror.

3. The electrically actuated rearview mirror of claim 2 wherein said X axis and said Y axis intersect and said spherical projection is provided with a cross section that approximately follows a radius that sweeps an arc having its center disposed approximately at the intersection of said X axis and said Y axis.

4. The electrically actuated rearview mirror of claim 2 wherein said cross further includes a central aperture through which said spherical projection extends.

5. The electrically actuated rearview mirror of claim 2 wherein at least one of said bearing means comprises a cylindrical post disposed on said cross and a bifurcated projection disposed on one of said mirror and said housing, said bifurcated projection defining a cylindrically-shaped cavity for receiving said cylindrical post in a snap-lock fashion.

6. The electrically actuated rearview mirror of claim 2 wherein said first and second surfaces are cylindrical in shape and each of said cylindrical surfaces extends along an arc of approximately 180° about said sphere.

7. The electrically actuated rearview mirror of claim 6 wherein said first and second cylindrical surfaces encompass opposing sides of said sphere.

8. The electrically actuated rearview mirror of claim 2 wherein said first and second surfaces encompass opposing sides of said sphere and said rearview mirror further includes means for compressing said sphere between said first and second surfaces.

9. The electrically actuated rearview mirror of claim 7 wherein said sphere and said first and second cylindrical surfaces are formed from a lubricious plastic.

10. The electrically actuated rearview mirror of claim 2 wherein each of said X and Y drive means includes an output shaft, a helical track encompassing a portion of said output shaft, a follower and a slide.

11. The electrically actuated rearview mirror of claim 10 wherein said slide associated with said X drive means includes said first surface and said slide associated with said Y drive means includes said second surface, each of said slides being slidably mounted in mutually orthogonal tracks disposed on said housing.

12. The electrically actuated rearview mirror of claim 11 wherein said follower is disposed on said slide, and slidably engages said helical track whereby rotation of said output shaft displaces said slide.

13. The electrically actuated rearview mirror of claim 12 wherein said follower is spring biased into engagement with said helical track, said follower being provided with a predetermined biasing force sufficiently strong to prevent slippage of said mirror during normal operating conditions, but weak enough to be overcome by said drive means when said slide reaches a stop and by application of manual force when an operator manually positions said mirror.

14. The electrically actuated rearview mirror of claim 13 wherein said follower comprises a leaf spring mounted on said slide and at least one projection disposed on said leaf spring for slidably engaging said helical track.

15. The electrically actuated rearview mirror of claim 14 wherein said helical track comprises a close wound coil spring encompassing a portion of said output shaft.

16. A remotely acutated rearview mirror comprising in combination;

a mirror;

a weathertight housing;

means for mounting said mirror on said housing for multi-directional pivotal movements relative thereto;

an acutating member;

means for mounting said actuating member on the back of said mirror for conjunctive pivotal movements therewith and for independent reciprocating movements relative thereto along an axis essentially normal to said back of said mirror;

said means for mounting comprising a generally spherical projection disposed on the back of said mirror, said spherical projection being approximately centered on said axis;

a penetration disposed in said housing, said means for mounting said actuating member extending therethrough;

a socket disposed in said housing, said socket surrounding said penetration;

a generally circular elastomeric seal disposed in said socket;

said spherical projection extending into said socket, said means for mounting further comprising a universal joint, said universal joint comprising a cross having four arms and a bearing means disposed on each of said arms, a first pair of said bearing means pivotally mounting said cross on said mirror and a second pair of said bearing means pivotally mounting said cross on said housing, said first and second pairs of bearing means being provided with a dimensional relationship with said mirror and said housing, respectively, that preloads said spherical projection against said seal to provide both a weathertight seal for said penetration in said housing and to provide a means for dampening vibration of said mirror; and said mirror further comprising remotely actuated drive means disposed within said housing and including first and second means disposed in engagement with said actuating member and cooperating to constrain said actuating member for movements in mutual orthogonal directions within a plane to impart said multi-directional pivotal movements to said mirror and said reciprocating movements of said actuating member as an incident thereto.

17. The remotely actuated rearview mirror of claim 16 wherein said actuating member defines a spherically-shaped surface; and said first and second drive means include first and second slide members, first and second means for mounting said first and second slide members in said housing for reciprocating movements in said mutually orthogonal directions, and first and second means for imparting reciprocating movements in said first and second slide members, said first and second slide members defining first and second concave cylindrically-shaped surfaces extending transversely of the direction of the reciprocating movements of said first and second slide members, and said first and second cylindrically-shaped surfaces being disposed in sliding surface-to-surface engagement with oppositely disposed portions of said spherically-shaped surface.

18. The remotely actuated rearview mirror of claim 17 wherein at least one of said first and second slide members and said first and second means for mounting said first and second slide members is resiliently deformable and operable to the bias of said first and second cylindrically-shaped surfaces into engagement with said spherically-shaped surface.

19. The remotely actuated rearview mirror of claim 16 or 17 wherein said first and second slide members are formed with first and second bearing openings aligned with the direction of reciprocating movement thereof; and said first and second means for imparting reciprocating movements to said first and second slide members includes first and second worm gear means each having first and second ends, said first ends of said first and second worm gear means being slidably and rotatable received within said first and second bearing openings and said second ends of said first and second worm gear means being coupled to first and second means for imparting rotational movements thereto, and first and second clutch mechanisms including first and second spring clips carried by said first and second slide members and normally disposed for driven surface engagement by said first and second worm gears, and said first and second spring clips being deformable for permitting ratchet-like movements thereof relative to said first and second worm gear means.

20. The remotely actuated rearview mirror of claim 20 wherein said means for mounting said mirror comprises means for pivotally mounting said mirror for mult-directional pivotal movements relative to a point and said spherical projection is provided with a cross section that approximately follows a radius that sweeps an arc having its center disposed approximately at said point.

21. The remotely actuated rearview mirror of claim 20 wherein said cross further includes a central aperture through which said spherical projection extends.

22. The remotely actuated rearview mirror of claim 16 wherein at least one of said bearing means comprises a cylindrical post disposed on said cross and a bifurcated projection disposed on one of said mirror and said housing, said bifurcated projection defining a cylindrically-shaped cavity for receiving cylindrical post in a snap-lock fashion.

23. The remotely actuated rearview mirror of claim 16 wherein said first and second means disposed in engagement with said actuating member comprise first and second surfaces, each of said surfaces extending along an arc of approximately 180° about said actuating member.

24. The electrically actuated rearview mirror of claim 23 wherein said first and second surfaces are cylindrical in shape and encompass opposing sides of said actuating member; and said actuating member comprises a sphere.

25. The electrically actuated rearview mirror of claim 24 wherein said first and second cylindrical surfaces encompass opposing sides of said sphere and said rearview mirror further includes means for compressing said sphere between said first and second surfaces.

26. The electrically actuated rearview mirror of claim 24 wherein said sphere and said first and second cylindrical surfaces are formed from a lubricious plastic.

27. The electrically actuated rearview mirror of claim 16 wherein said drive means comprises X and Y drive means, each of said X and Y drive means including an output shaft, a helical track encompassing a portion of said output shaft, a follower and a slide.

28. The electrically actuated rearview mirror of claim 27 wherein said slide associated with said X drive means includes a first surface encompassing a portion of said actuating member and said slide associated with said Y drive means includes a second surface encompassing a portion of said actuating member, each of said slides being slidably mounted in mutually orthogonal tracks disposed in said housing.

29. The electrically actuated rearview mirror of claim 28 wherein said follower is disposed on said slide, and slidably engages said helical track whereby rotation of said output shaft displaces said slide.

30. The electrically actuated rearview mirror of claim 29 wherein said follower is spring biased into engagement with said helical track, said follower being provided with a predetermined biasing force sufficiently strong to prevent slippage of said mirror during normal operating conditions, but weak enough to be overcome by said drive means when said slide reaches a stop and by application of manual force when an operator manually positions said mirror.

31. The electrically actuated rearview mirror of claim 30 wherein said follower comprises a leaf spring mounted on said slide and at least one projection disposed on said leaf spring for slidably engaging said helical track.

32. The electrically actuated rearview mirror of claim 31 wherein said helical track comprises a close wound coil spring encompassing a portion of said output shaft.

* * * * *

UNITED STATES PATENT AND TRADEMARK OFFICE
CERTIFICATE OF CORRECTION

PATENT NO. : 4,444,466
DATED : April 24, 1984
INVENTOR(S) : Walter R. Deshaw

It is certified that error appears in the above-identified patent and that said Letters Patent is hereby corrected as shown below:

Column 1, lines 40 and 41:
    "temmperatures" should be --temperatures--.

Column 2, line 1:
    "discosed" should be --disclosed--.

Column 2, line 5:
    "effect" should be --effects--.

Column 2, line 65:
    "slide" should be --side--.

Column 3, line 48:
    "dammpening" should be --dampening--.

Column 6, line 33:
    After "fluid" insert --tight--.

Column 9, Claim 2, line 27:
    "direction" should be --directions--.

Column 9, Claim 2, line 31:
    "in" should be --to--.

Column 10, Claim 11, line 4:
    "on" should be --in--.

Column 11, Claim 17, line 14:
    "in" should be --to--.

UNITED STATES PATENT AND TRADEMARK OFFICE
CERTIFICATE OF CORRECTION

PATENT NO. : 4,444,466

DATED : April 24, 1984

INVENTOR(S) : Walter R. Deshaw

It is certified that error appears in the above-identified patent and that said Letters Patent is hereby corrected as shown below:

Column 11, Claim 20, line 51:
"20" should be --16--.

Column 11, Claim 20, line 53:
"mult" should be --multi--.

Column 12, Claim 22, line 6:
After "receiving" insert --said--.

Signed and Sealed this

Fifth Day of March 1985

[SEAL]

Attest:

DONALD J. QUIGG

Attesting Officer

Acting Commissioner of Patents and Trademarks